US012739253B2

(12) United States Patent
Burle et al.

(10) Patent No.: US 12,739,253 B2
(45) Date of Patent: Sep. 15, 2026

(54) CONVERTING ENFORCEMENT POLICY INFORMATION INTO PROVISIONING TEMPLATE INFORMATION

(71) Applicant: VMware LLC, Palo Alto, CA (US)

(72) Inventors: Siddharth Sukumar Burle, Pune (IN); Manish Jain, Faridabad (IN); Vishal Gupta, Ludhiana (IN); Amit Meena, Pune (IN); Suraj Malgave, Kolhapur (IN)

(73) Assignee: VMware LLC, Palo Alto, CA (US)

( * ) Notice: Subject to any disclaimer, the term of this patent is extended or adjusted under 35 U.S.C. 154(b) by 119 days.

(21) Appl. No.: 18/647,852

(22) Filed: Apr. 26, 2024

(65) Prior Publication Data

US 2025/0126120 A1 Apr. 17, 2025

(30) Foreign Application Priority Data

Oct. 15, 2023 (IN) ............................ 202341069397

(51) Int. Cl.
*H04L 9/40* (2022.01)
*G06F 9/455* (2018.01)

(52) U.S. Cl.
CPC .......... *H04L 63/10* (2013.01); *G06F 9/45558* (2013.01); *G06F 2009/45562* (2013.01)

(58) Field of Classification Search
CPC ................. H04L 63/10; G06F 9/45558; G06F 2009/45562
See application file for complete search history.

(56) References Cited

U.S. PATENT DOCUMENTS 8,533,724 B1 * 9/2013 Theimer ............ G06F 9/45558 718/1
11,425,260 B1 * 8/2022 Liu ...................... H04L 65/102
2015/0040025 A1 * 2/2015 Deklich ............... G06F 9/5072 715/744
2018/0176088 A1 * 6/2018 Ellappan ............ G06F 9/45558
2020/0285715 A1 * 9/2020 Seguin ................... H04L 63/10
2021/0250242 A1 * 8/2021 Zhang ................ H04L 41/5048
2023/0412641 A1 * 12/2023 Watkiss ............. G06F 9/45558
2024/0111513 A1 * 4/2024 Caine ................ G06F 9/45558

* cited by examiner

*Primary Examiner* — Richard G Keehn
(74) *Attorney, Agent, or Firm* — Quarles & Brady LLP

(57) ABSTRACT

Systems, apparatus, articles of manufacture, and methods are disclosed for converting enforcement policy information into provisioning template information by instantiating or executing machine-readable instructions to determine a type of a first placeholder of a provisioning template with a plurality of placeholders, copy enforcement policy data corresponding to the determined type of the first placeholder, fill the first placeholder of the provisioning template with the copied enforcement policy data, and save the provisioning template.

20 Claims, 13 Drawing Sheets

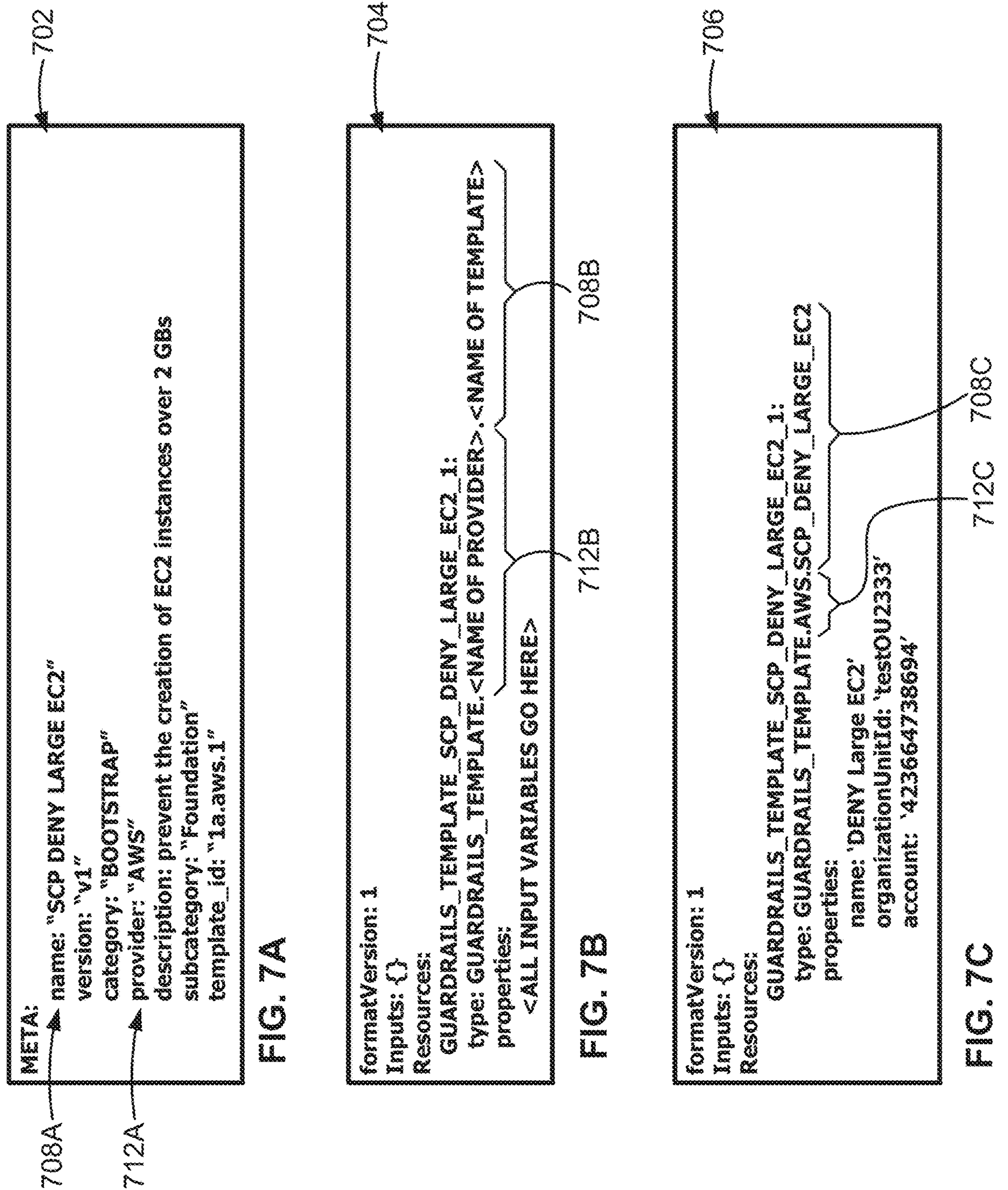
702
META:
name: "SCP DENY LARGE EC2"
version: "v1"
category: "BOOTSTRAP"
provider: "AWS"
description: prevent the creation of EC2 instances over 2 GBs
subcategory: "Foundation"
template_id: "1a.aws.1"
708A
712A
FIG. 7A
704
formatVersion: 1
Inputs: {}
Resources:
GUARDRAILS_TEMPLATE_SCP_DENY_LARGE_EC2_1:
type: GUARDRAILS_TEMPLATE.<NAME OF PROVIDER>.<NAME OF TEMPLATE>
properties:
<ALL INPUT VARIABLES GO HERE>
708B
712B
FIG. 7B
706
formatVersion: 1
Inputs: {}
Resources:
GUARDRAILS_TEMPLATE_SCP_DENY_LARGE_EC2_1:
type: GUARDRAILS_TEMPLATE.AWS.SCP_DENY_LARGE_EC2
properties:
name: 'DENY Large EC2'
organizationUnitId: 'testOU2333'
account: '423664738694'
708C
712C
FIG. 7C

CONVERTING ENFORCEMENT POLICY INFORMATION INTO PROVISIONING TEMPLATE INFORMATION

RELATED APPLICATIONS

This application claims priority to and the benefit under 35 U.S.C. 119(a)-(d) to Indian Application No. 202341069397 filed Oct. 15, 2023, entitled "CONVERTING ENFORCEMENT POLICY INFORMATION INTO PROVISIONING TEMPLATE INFORMATION", by VMware LLC, the entire contents of which is hereby incorporated.

FIELD OF THE DISCLOSURE

This disclosure relates generally to cloud computing and, more particularly, to converting enforcement policy information into provisioning template information.

BACKGROUND

In recent years, cloud computing template files are selected by users in provisioning and deploying cloud resources. The cloud computing resources are provisioned and may deploy virtual machines. In some examples, these deployed virtual machines lack governance with a target state.

BRIEF DESCRIPTION OF THE DRAWINGS

FIG. 7A is an example of an enforcement protocol information.

FIG. 7B is an example of an example template file with placeholder data.

FIG. 7C is the example template file of FIG. 7B filled with the example enforcement protocol information of FIG. 7A.

In general, the same reference numbers will be used throughout the drawing(s) and accompanying written description to refer to the same or like parts. The figures are not necessarily to scale.

DETAILED DESCRIPTION

Figure 1:
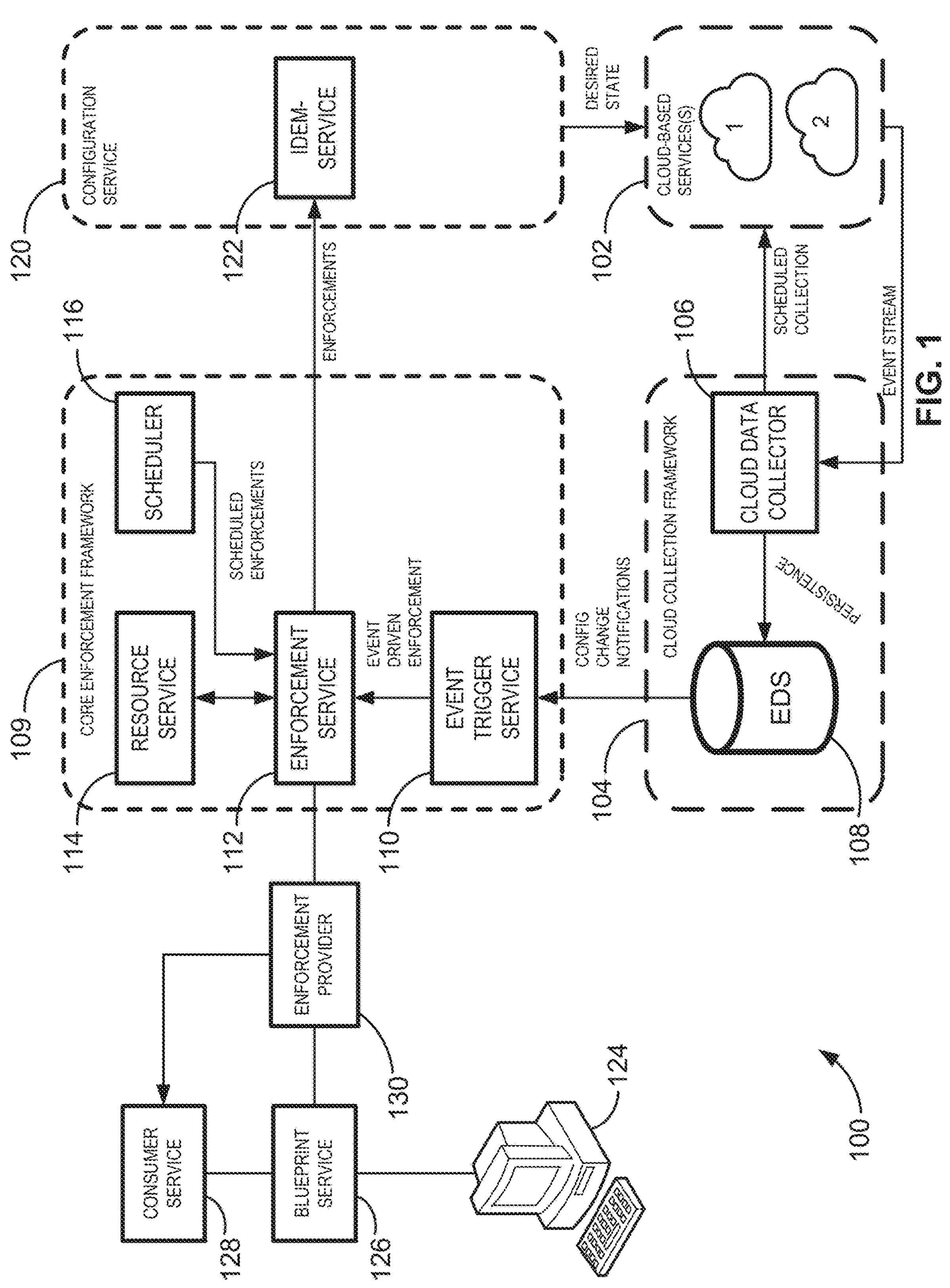
FIG. 1 is a schematic block diagram of an example environment in which an example enforcement provider operates to convert enforcement protocol information from an example enforcement service into user-selectable template information for use by an example blueprint service and an example consumer service.

FIG. 1 is a schematic block diagram of an example environment 100 in which an example enforcement provider 130 operates to provide an exposed enforcement policy from an example enforcement service 112 for use by an example consumer service 128 and an example blueprint service 126 as a provisioning template. In the illustrated example of FIG. 1, aspects and/or components of the environment 100 function as a system that manages operations and usage of at least one cloud-based service 102. The management of the operations can pertain to configuring settings, managing resource usage and/or managing access of the cloud-based service(s) 102. The example architecture shown in the example of FIG. 1 is only an example and any other architecture, network, control scheme, communication and/or data topology can be implemented instead.

According to examples disclosed herein, an example cloud collection framework 104 includes an example cloud data collector 106 to coordinate and communicate with the cloud-based service(s) 102. To that end, the example cloud data collector 106 extracts, receives and/or queries information (e.g., components, metadata, services, service information) from the cloud-based service(s) 102. In this example, the cloud data collector 106 requests and/or directs the cloud-based service(s) 102 to provide information related to: (1) accounts utilizing the cloud-based service(s) 102, (2) at least one configuration of the cloud-based service(s) 102 and/or (3) services of the cloud-based service(s) 102. The request by the cloud data collector 106 to the cloud-based service(s) 102 can be driven by an occurrence of an event or performed on periodic or aperiodic timeframes and/or on a schedule. According to examples disclosed herein, the cloud-based service(s) 102 provide(s) data, requested changes, configuration information and/or updates associated with the cloud-based service(s) 102 to the cloud data collector 106 in response to a query from the cloud data collector 106 or without receiving a query from the cloud data collector 106. In some examples, the aforementioned data and/or updates provided to the cloud data collector 106 can include changes of a configuration of the cloud-based service(s) 102 and/or operational data of the cloud-based service(s) 102.

In this example, the aforementioned cloud collection framework 104 also includes an example entity data service (EDS) 108. The example EDS 108 can be implemented as a database, data store, database manager and/or database framework to store and/or collect data associated with the cloud-based service(s) 102. The example EDS 108 stores entity data of the cloud-based service(s) 102 in a normalized form (e.g., as a centralized repository). According to examples disclosed herein, the EDS 108 can provide any requested or proposed configuration change request to a core enforcement framework 109 which, in turn, includes an example event trigger service 110, the example enforcement service 112, an example resource service 114 and an example scheduler 116. For example, when an event occurs, such as a rule change and/or a configuration change corresponding to the cloud-based service(s) 102, a notification from the EDS 108 is provided to the event trigger service 110.

The event trigger service 110 of the illustrated example is implemented to direct enforcement, configuration changes and/or access to services (e.g., microservices) of the cloud-based service(s) 102. The example event trigger service 110 can map a configuration change event to a desired state of the cloud service(s). Accordingly, the example event trigger service 110 can direct control, usage and/or configuration of the cloud-based service(s) 102 via (or in conjunction with) the aforementioned enforcement service 112. In this example, the event trigger service 110 provides requests and/or commands pertaining to event-driven enforcement of the cloud-based service(s) 102 to the enforcement service 112. In some examples, the event trigger service 110 manages and/or directs changes to key value data stores. In some examples, the event trigger service 110 can utilize and/or implement a Kubernetes cluster.

The example enforcement service 112 determines, manages and provides enforcements (e.g., configuration changes, access changes, resource usage instructions, a desired state change, etc.) with respect to the cloud-based service(s) 102 to a configuration service 120 based on the event-driven enforcements and/or instructions received from the event trigger service 110. Additionally or alternatively, notifications (e.g., configuration change notifications), enforcements and/or instructions received from the resource service 114 and the scheduler 116 cause the enforcement service 112 to provide enforcements to the configuration service 120. In turn, the enforcements provided to the configuration service 120 are subsequently provided to the cloud-based service(s) 102 as desired state changes (e.g., desired state change instructions or directives). In some examples, the enforcements offered by the example enforcement service 112 are accessible by an automated query language endpoint (e.g., a GraphQL endpoint).

In this example, the resource service 114 stores and/or manages operational data and/or settings of the cloud-based service(s) 102. In this example, the resource service 114 contains, analyzes and/or manages metadata of the cloud-based service(s) 102 that is utilized to manage the cloud-based service(s) 102. In particular, the metadata corresponds to settings, access information and/or configurations of the cloud-based service(s) 102, for example.

In some examples, the aforementioned scheduler 116 directs and/or manages scheduled implementations, configuration changes, enforcements and/or updates (e.g., periodic updates) of the cloud-based service(s) 102 via the example enforcement service 112 and the example configuration service 120. For example, the scheduler 116 can schedule the enforcement service 112 to perform scheduled enforcements of the configuration service 120 which, in turn, controls and/or directs a desired state of the cloud-based service(s) 102.

To control, manage, enforce and/or direct operation of the cloud-based service(s) 102, as mentioned above, the example enforcement service 112 provides the enforcements to the configuration service 120. In this example, the configuration service 120 includes an idempotent (IDEM) service 122 that is distinct from the core enforcement framework 109 and, thus, the enforcement service 112. However, the IDEM service 122 can be integrated with the enforcement service 112 and/or the core enforcement framework 109 in other examples. In the illustrated example of FIG. 1, the IDEM service 122 is an implementation of a provisioning engine that implements desired state changes with respect to the cloud-based service(s) 102. In other words, the IDEM service 122 controls a desired state of the cloud-based service(s) 102 based on enforcements provided from the enforcement service 112. While the enforcement provider 130 is shown implemented outside the example enforcement service 112, additionally or alternatively, the enforcement provider 130 can be implemented in the event trigger service 110, in the enforcement service 112, the resource service 114 and/or the scheduler 116.

As mentioned above, any appropriate data topology, architecture and/or structure can be implemented instead. Further, any of the aforementioned aspects and/or elements described in connection with FIG. 1 can be combined or separated as appropriate. Further, while examples disclosed herein are shown in the context of cloud services, examples disclosed herein can be implemented in conjunction with any appropriate distributed and/or shared computing resource system.

Figure 2:
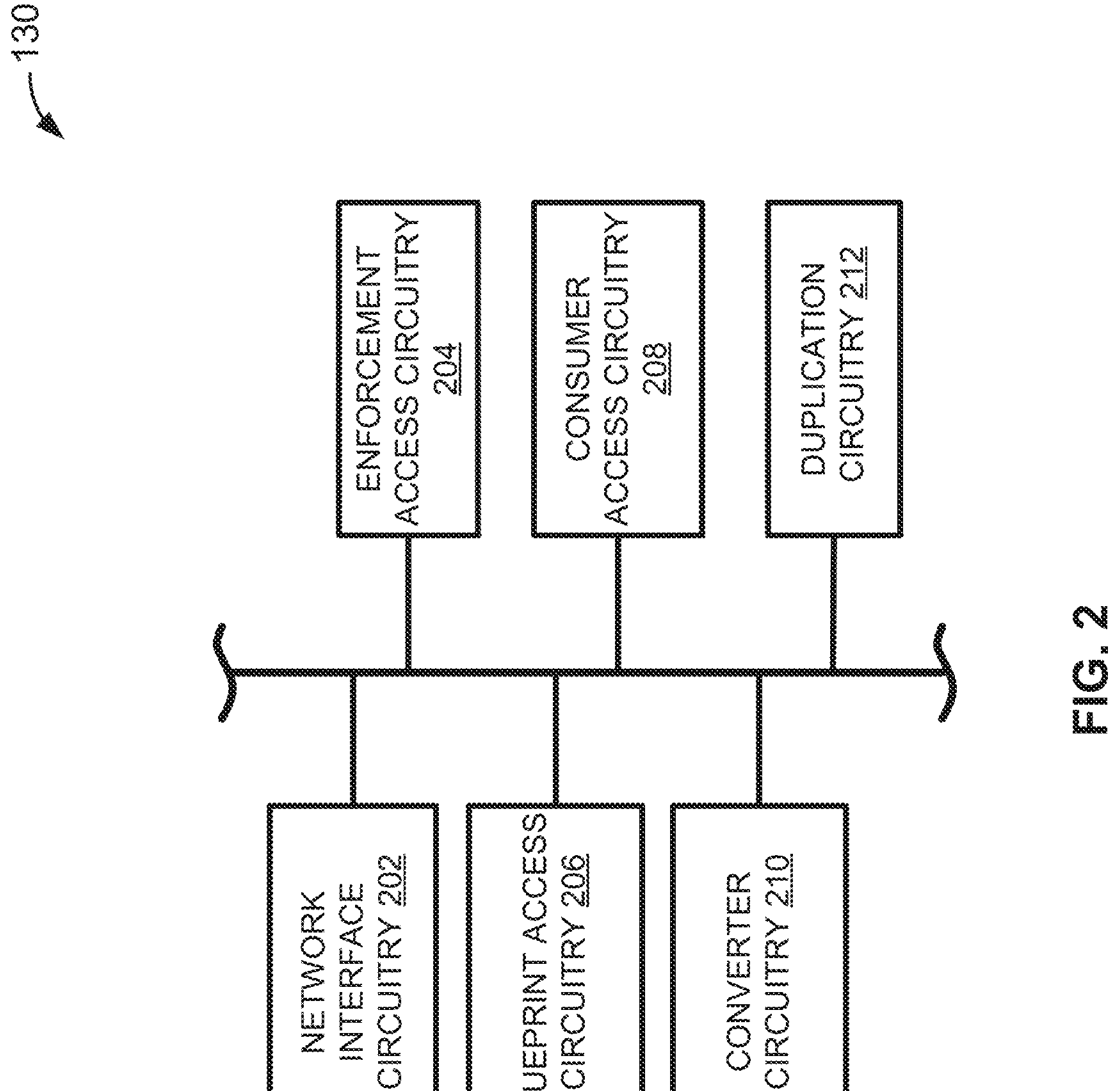
FIG. 2 is a block diagram of an example implementation of the example enforcement provider of FIG. 1.

FIG. 2 is a block diagram of an example implementation of the enforcement provider 130 of FIG. 1 to provide the exposed enforcement policy to the blueprint service 126 and the example consumer service 128 as a provisioning template. The enforcement provider 130 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the enforcement provider 130 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The example enforcement provider 130 includes example network interface circuitry 202, example enforcement access circuitry 204, example blueprint access circuitry 206, example consumer access circuitry 208, example converter circuitry 210 and example duplication circuitry 212. The example network interface circuitry 202 is to provide network communication to the example blueprint service 126 (FIG. 1), the example consumer service 128 (FIG. 1) and the example enforcement service 112 (FIG. 1). The example network interface circuitry 202 is to access, retrieve, transmit, save, and store data. For example, the network interface circuitry 202 allows for communications over any suitable wired and/or wireless network(s) including, for example, one or more data buses, one or more Local Area Networks (LANs), one or more wireless LANs, wide area network, a cloud, one or more cellular networks, the Internet, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events. In some examples, the enforcement access circuitry 204, the blueprint access circuitry 206, and the consumer access circuitry 208 are to use the example network interface circuitry 202 to access the example enforcement service 112 (FIG. 1), the example blueprint service 126 (FIG. 1), and the example consumer service 128 (FIG. 1).

The example enforcement access circuitry 204 is to use the example network interface circuitry 202 to communicate with the example enforcement service 112 (FIG. 1). For example, the enforcement access circuitry 204 accesses at least one exposed enforcement policy (e.g., exposed enforcement protocol, exposed organizational policy, VMware's Guardrails® security policy, VMware's Guardrails® template file, first enforcement information, etc.). In some examples, the enforcement service 112 (FIG. 1) updates or offers the enforcement policies that the example enforcement service 112 (FIG. 1) will enforce by monitoring and changing the configuration state (e.g., desired state) of the cloud resources that have an attached enforcement policy. Some of the enforcement policies include key rotation after a specific time interval (e.g., ninety days), elimination of unused resources, prevention of the creation of large virtual machines (e.g., a virtual machine over two gigabytes of RAM), monetary budget analysis, virtual machine performance anomaly checks, encryption of cloud resources. The enforcement policies may belong to a different category such as configuration, observation, cost, and security. Multiple enforcement policies may be applied to a virtual machine or cloud resource instance.

In some examples, the enforcement access circuitry 204 scans the example enforcement service 112 (FIG. 1) to determine if any new enforcement policies have been exposed. In such examples, the enforcement access circuitry 204 may use a GraphQL automated query language API to determine the exposed enforcement policies. The example enforcement access circuitry 204 with the example network interface circuitry 202 retrieves the exposed enforcement policies so that the example enforcement provider 130 can convert the exposed enforcement policies into an uncompleted provisioning template (e.g., new template, fresh template, blank template, unused template, uninhabited template, uncompleted VMware's VCT® schema, first template information, user-selectable template, etc.). After the uncompleted provisioning template is finalized into a completed provisioning template (e.g., final template, filled template, developed template, used template, inhabited template, completed VMware's VCT® schema, second template information, etc.), the example enforcement provider 130 converts the completed provisioning template into a provisioned enforcement policy (e.g., provisioned enforcement protocol, provisioned organizational policy, VMware's Guardrails® security policy, VMware's Guardrails® template file, second enforcement information, etc.). The example enforcement access circuitry 204 with the example network interface circuitry 202 transmits the provisioned enforcement policy to the example enforcement service 112 (FIG. 1).

The example blueprint access circuitry 206 is to use the example network interface circuitry 202 to communicate with the example blueprint service 126 (FIG. 1). The example blueprint service 126 (FIG. 1) is to transmit a completed provisioning template to the example blueprint access circuitry 206. The example blueprint access circuitry 206 retrieves the completed provisioning template (e.g., provisioning request information) so that the example enforcement provider 130 can convert the completed provisioning template to a provisioned enforcement policy.

The example consumer access circuitry 208 is to use the example network interface circuitry 202 to communicate with the example consumer service 128 (FIG. 1). The example consumer service 128 (FIG. 1) is to receive an uncompleted provisioning template from the example consumer access circuitry 208. The example consumer service 128 (FIG. 1) offers the uncompleted provisioning template as a user-selectable resource for provisioning cloud resources. For example, a user may select, by accessing the consumer service 128 (FIG. 1), the uncompleted provisioning template for a key rotation security policy and a virtual machine instance of four gigabytes of RAM, sixteen gigabytes of storage, and a region in Europe.

The example converter circuitry 210 is to determine the format (e.g., preset guide, structure, layout, etc.) of the enforcement policies and the provisioning templates. For example, the converter circuitry 210 may determine that a location for name data in the enforcement policy is in a metadata location, and a corresponding location for name data in the provisioning template is the second line. The example converter circuitry 210 is to determine the type of the placeholder data that is present in the provisioning template and determine the corresponding data from the example enforcement policy that can fill (e.g., replace) the placeholder data. In some examples, the converter circuitry 210 extracts the corresponding data from the enforcement policy.

The example duplication circuitry 212 is to copy (e.g., duplicate, replicate, extract) the corresponding data from the example enforcement policy and paste (e.g., overwrite, replace, change, substitute, fill etc.) the corresponding data in a corresponding location of the placeholder data. As described in connection with FIG. 7A-7C, the duplication circuitry 212 copies the name of the provider 712A of FIG. 7A ("AWS") from the enforcement policy and replaces the placeholder data 712B of FIG. 7B ("NAME OF PROVIDER") such that one of the lines of code of the provisioning template illustrated in the software instruction representation 706 of FIG. 7C lists "TYPE: GUARDRAILS_TEMPLATE.AWS.SCP_DENY_LARGE_EC2." Once the example provisioning template includes the target virtual machine (e.g., the provisioning template is completed), the example duplication circuitry 212 can copy the target virtual machine information to a provisioned enforcement policy. The example enforcement service 112 (FIG. 1) can use the provisioned enforcement policy to monitor the selected virtual machine and enforce the provisioned enforcement policy in the configuration of the selected virtual machine.

Figure 4:
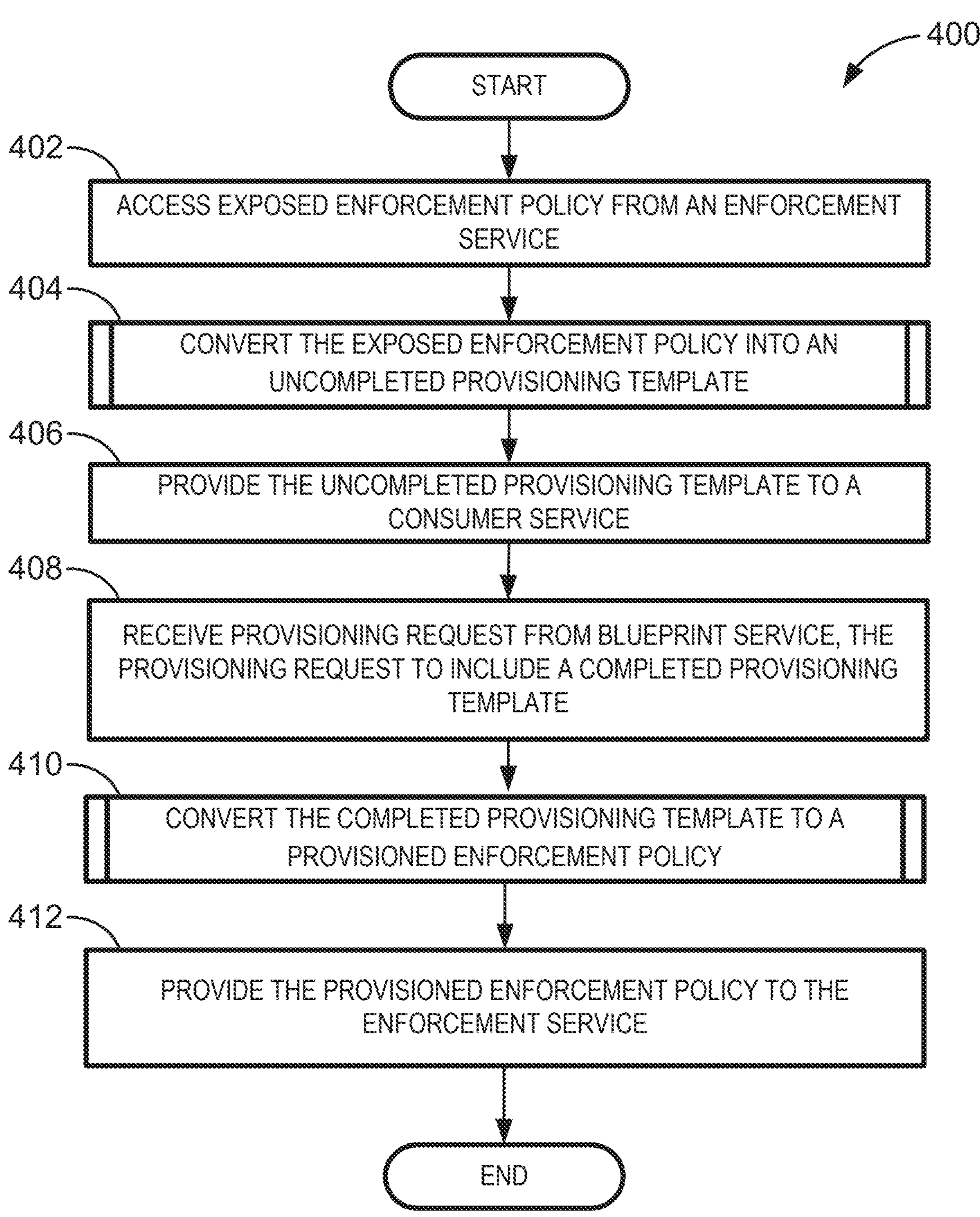
FIG. 4 is a flowchart representative of example machine readable instructions and/or example operations that may be executed, instantiated, and/or performed by example programmable circuitry to implement the enforcement provider of FIG. 2 to convert and transmit information.
Figure 5:
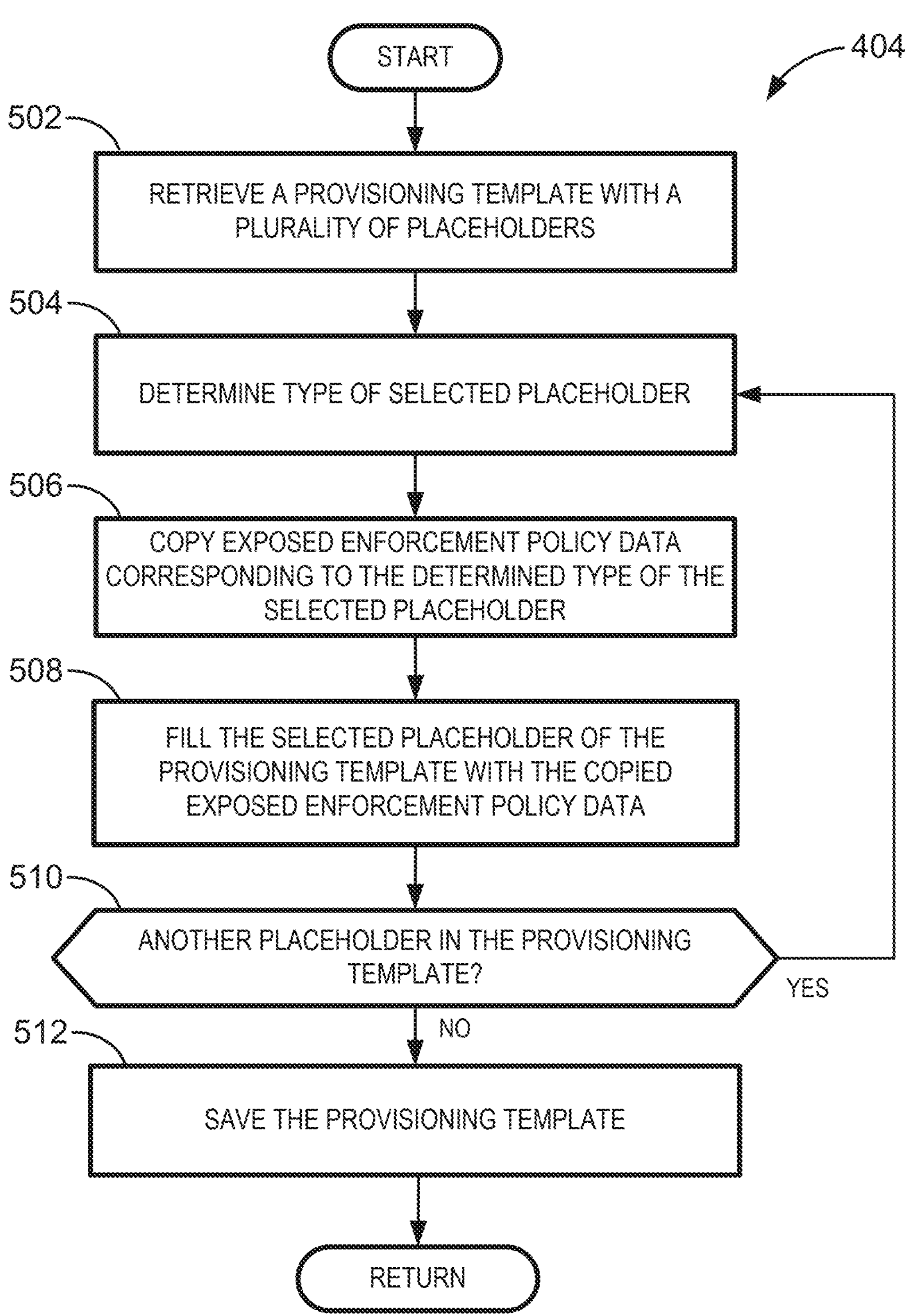
FIG. 5 is a flowchart representative of example machine readable instructions and/or example operations that may be executed, instantiated, and/or performed by example programmable circuitry to implement the enforcement provider of FIG. 2 to convert first enforcement protocol information into user-selectable template file information.
Figure 6:
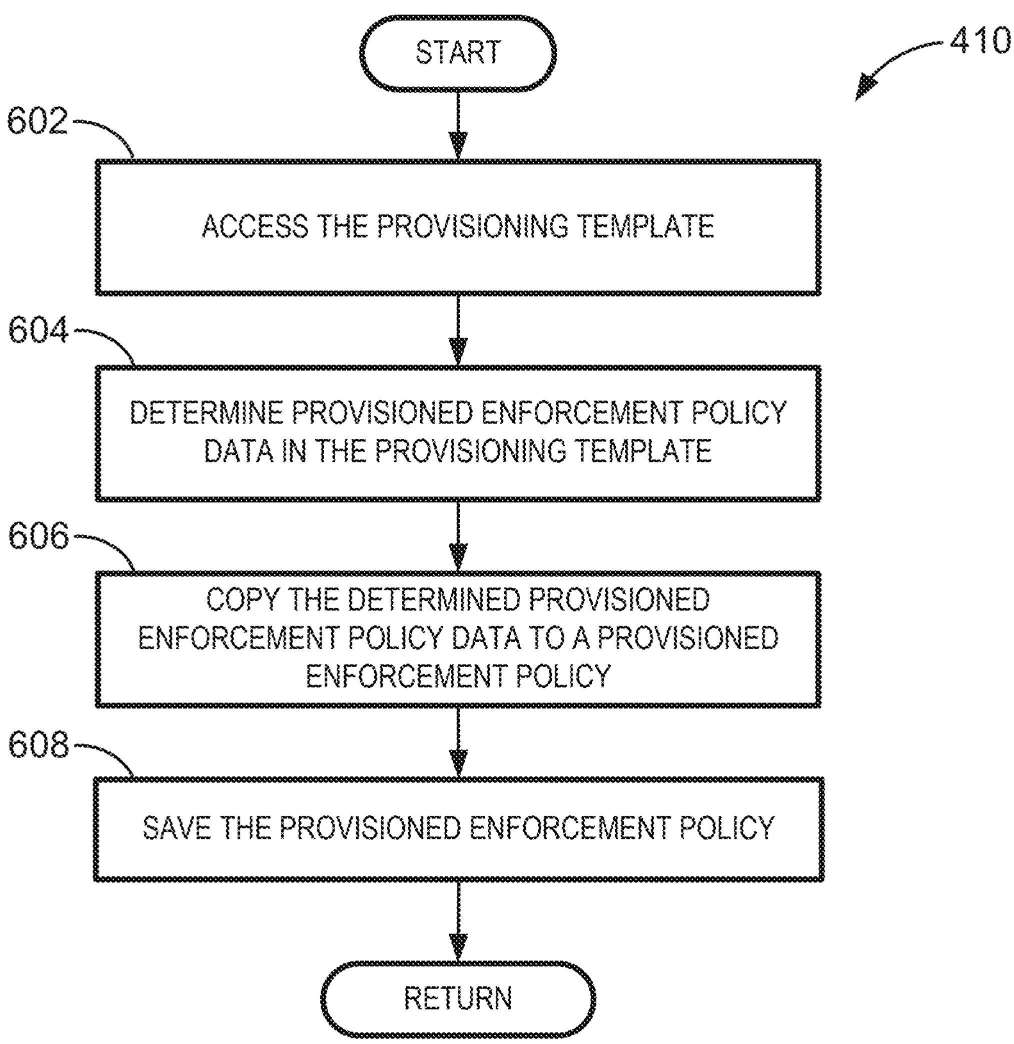
FIG. 6 is a flowchart representative of example machine readable instructions and/or example operations that may be executed, instantiated, and/or performed by example programmable circuitry to implement the enforcement provider of FIG. 2 to convert user-selectable template file information into second enforcement protocol information.

In some examples, the network interface circuitry 202 is instantiated by programmable circuitry executing network interface instructions and/or configured to perform operations such as those represented by the flowcharts of FIGS. 4-6.

In some examples, the enforcement provider 130 includes means for transmitting information. For example, the means for transmitting may be implemented by the network interface circuitry 202. In some examples, the network interface circuitry 202 may be instantiated by programmable circuitry such as the example programmable circuitry 1012 of FIG. 10. For instance, the network interface circuitry 202 may be instantiated by the example microprocessor 1100 of FIG. 11 executing machine executable instructions such as those implemented by at least blocks 402, 406, 408, 412 of FIG. 4, block 502 of FIG. 5, and block 602 of FIG. 6. In some examples, network interface circuitry 202 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the network interface circuitry 202 may be instantiated by any other combination of hardware, software, and/or firmware. For example, the network interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the enforcement access circuitry 204 is instantiated by programmable circuitry executing enforcement access instructions and/or configured to perform operations such as those represented by the flowcharts of FIGS. 4-6.

In some examples, the enforcement provider 130 includes means for accessing enforcement service information. For example, the means for accessing enforcement service information may be implemented by the enforcement access circuitry 204. In some examples, the enforcement access circuitry 204 may be instantiated by programmable circuitry such as the example programmable circuitry 1012 of FIG. 10. For instance, the enforcement access circuitry 204 may be instantiated by the example microprocessor 1100 of FIG. 11 executing machine executable instructions such as those implemented by at least blocks 402 and 412 of FIG. 4 and block 608 of FIG. 6. In some examples, enforcement access circuitry 204 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the enforcement access circuitry 204 may be instantiated by any other combination of hardware, software, and/or firmware. For example, the enforcement access circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the blueprint access circuitry 206 is instantiated by programmable circuitry executing blueprint access instructions and/or configured to perform operations such as those represented by the flowcharts of FIGS. 4-6.

In some examples, the enforcement provider 130 includes means for accessing provisioning request information. For example, the means for accessing provisioning request information may be implemented by the blueprint access circuitry 206. In some examples, the blueprint access circuitry 206 may be instantiated by programmable circuitry such as the example programmable circuitry 1012 of FIG. 10. For instance, the blueprint access circuitry 206 may be instantiated by the example microprocessor 1100 of FIG. 11 executing machine executable instructions such as those implemented by at least block 408 of FIG. 4 and block 602 of FIG. 6. In some examples, the blueprint access circuitry 206 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the blueprint access circuitry 206 may be instantiated by any other combination of hardware, software, and/or firmware. For example, the blueprint access circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the consumer access circuitry 208 is instantiated by programmable circuitry executing consumer access instructions and/or configured to perform operations such as those represented by the flowcharts of FIGS. 4-5.

In some examples, the enforcement provider 130 includes means for providing provisioning template information. For example, the means for providing may be implemented by the consumer access circuitry 208. In some examples, the consumer access circuitry 208 may be instantiated by programmable circuitry such as the example programmable circuitry 1012 of FIG. 10. For instance, the consumer access circuitry 208 may be instantiated by the example microprocessor 1100 of FIG. 11 executing machine executable instructions such as those implemented by at least block 406 of FIG. 4 and block 512 of FIG. 5. In some examples, the consumer access circuitry 208 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the consumer access circuitry 208 may be instantiated by any other combination of hardware, software, and/or firmware. For example, the consumer access circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the converter circuitry 210 is instantiated by programmable circuitry executing converter instructions and/or configured to perform operations such as those represented by the flowcharts of FIGS. 4-6.

In some examples, the enforcement provider 130 includes means for converting enforcement policy information. For example, the means for converting may be implemented by the converter circuitry 210. In some examples, the converter circuitry 210 may be instantiated by programmable circuitry such as the example programmable circuitry 1012 of FIG. 10. For instance, the converter circuitry 210 may be instantiated by the example microprocessor 1100 of FIG. 11 executing machine executable instructions such as those implemented by at least blocks 404, 410 of FIG. 4, blocks 504, 510 and 512 of FIG. 5, and block 604 and 608 of FIG. 6. In some examples, the converter circuitry 210 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the converter circuitry 210 may be instantiated by any other combination of hardware, software, and/or firmware. For example, the converter circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the duplication circuitry 212 is instantiated by programmable circuitry executing duplication instructions and/or configured to perform operations such as those represented by the flowcharts of FIGS. 5-6.

In some examples, the enforcement provider 130 includes means for duplicating information. For example, the means for duplicating may be implemented by the duplication circuitry 212. In some examples, the duplication circuitry 212 may be instantiated by programmable circuitry such as the example programmable circuitry 1012 of FIG. 10. For instance, the duplication circuitry 212 may be instantiated by the example microprocessor 1100 of FIG. 11 executing machine executable instructions such as those implemented by at least blocks 506, 508 of FIG. 5 and block 606 of FIG. 6. In some examples, the duplication circuitry 212 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the duplication circuitry 212 may be instantiated by any other combination of hardware, software, and/or firmware. For example, the duplication circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the enforcement provider 130 of FIG. 1 is illustrated in FIG. 2, one or more of the elements, processes, and/or devices illustrated in FIG. 2 may be combined, divided, re-arranged, omitted, eliminated, and/or implemented in any other way. Further, the example network interface circuitry 202, the example enforcement access circuitry 204, the example blueprint access circuitry 206, the example consumer access circuitry 208, the example converter circuitry 210, and the example duplication circuitry 212, and/or, more generally, the example enforcement provider 130 of FIG. 2, may be implemented by hardware alone or by hardware in combination with software and/or firmware. Thus, for example, any of the example network interface circuitry 202, the example enforcement access circuitry 204, the example blueprint access circuitry 206, the example consumer access circuitry 208, the example converter circuitry 210, and the example duplication circuitry 212, and/or, more generally, the example enforcement provider 130, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example enforcement provider 130 of FIG. 2 may include one or more elements, processes, and/or devices in addition to, or instead of, those illustrated in FIG. 2, and/or may include more than one of any or all of the illustrated elements, processes and devices.

Figure 3:
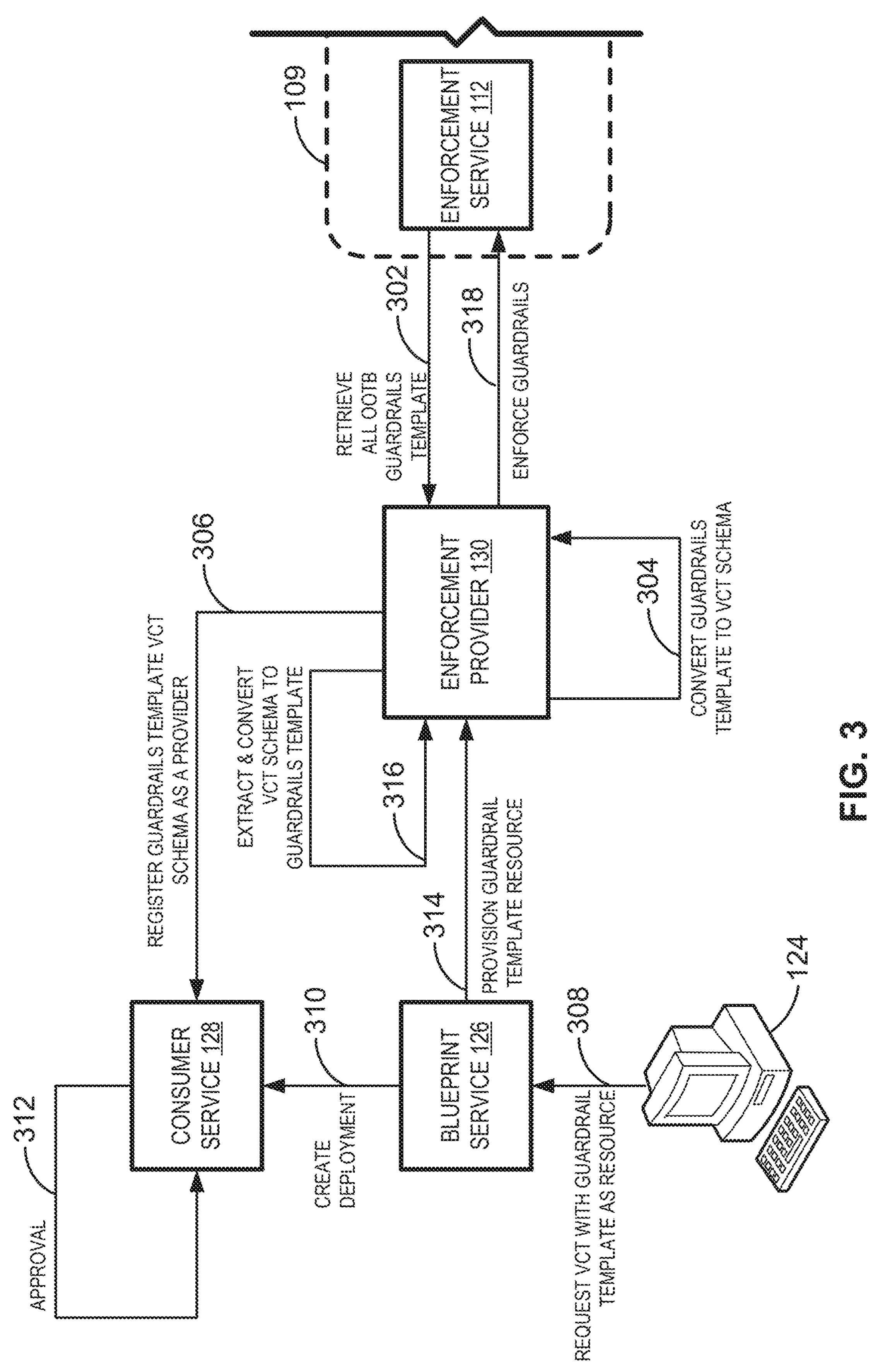
FIG. 3 is an example sequence diagram of the example operations performed by the example enforcement provider, enforcement service, blueprint service, and consumer service of FIG. 1.

FIG. 3 is an example sequence diagram of the example operations performed by the example enforcement provider 130, the example enforcement service 112, blueprint service 126, and the example consumer service 128 of FIG. 1. FIG. 3 is a simplification of FIG. 1, as some of the elements of FIG. 1 are removed for clarity. At the example first operation 302, the example enforcement provider 130 retrieves at least one exposed enforcement policy (e.g., exposed enforcement protocol, exposed organizational policy, VMware's Guardrails® security policy, VMware's Guardrails® template file, first enforcement information, etc.) from the example enforcement service 112. The example enforcement provider 130 may use the example network interface circuitry 202 (FIG. 2) and the example enforcement access circuitry 204 (FIG. 2) to retrieve the exposed enforcement policy. In some examples, the enforcement service 112 transmits the example exposed enforcement policy without being prompted by the example enforcement provider 130. In some examples, the exposed enforcement policies are out-of-the-box (OOTB) policies.

At the example second operation 304, the example enforcement provider 130 converts the exposed enforcement policies into an uncompleted provisioning template (e.g., new template, fresh template, blank template, unused template, uninhabited template, uncompleted VMware's VCT® schema, first template information, user-selectable template, etc.) as described in connection with FIG. 5. The example enforcement provider 130 uses the example converter circuitry 210 (FIG. 2) and the example duplication circuitry 212 (FIG. 2) to extract (e.g., copy) some of the enforcement policy information from the exposed enforcement policies and paste the extracted enforcement policy information into an uncompleted provisioning template by replacing placeholder data in the uncompleted provisioning template. In some examples, the example converter circuitry 210 (FIG. 2) converts the enforcement policy information by changing the actual file into a format that matches the format of an uncompleted provisioning template.

At the example third operation 306, the example enforcement provider 130 provides the uncompleted provisioning template to the example consumer service 128. For example, the example enforcement provider 130 uses the consumer access circuitry 208 to transmit the uncompleted provisioning template to the consumer service 128. The example consumer service 128 is to offer the uncompleted provisioning template as a user-selectable option to apply in a virtual provisioning environment. In some examples, the enforcement provider 130 registers the uncompleted provisioning template as a cloud resource provider for access by the example consumer service 128. In such examples, the consumer service 128 has access to multiple cloud resource providers such as Amazon Web Services, Microsoft Azure, and Google Cloud Platform. The example consumer service 128 offers the cloud resources offered by the cloud resource providers to an example workstation 124. In such examples, the uncompleted provisioning template refers to user-selectable enforcement policies that can be selected by a workstation 124 and then subsequently enforced by the example enforcement service 112.

At the fourth operation 308, the example workstation 124 submits a request. For example, a user may indicate (e.g., select) the uncompleted provisioning template which is offered by the example consumer service 128. As illustrated in connection with FIGS. 8-9, the user (e.g., cloud developer) may use the example workstation 124 to select an uncompleted provisioning template that is based on an enforcement policy. In such examples, the uncompleted provisioning template can be selected similar to how cloud resources can be selected. The example user (e.g., cloud developer) by using the example workstation 124 then can apply the uncompleted provisioning template to be applied to other selected cloud infrastructure resources. Once the example blueprint service 126 provisions and deploys the selected cloud infrastructure resources, the enforcement service 112 will enforce the target state specified by the uncompleted provisioning template that was applied to the selected cloud infrastructure resources.

At the fifth operation 310, the example blueprint service 126 receives the request from the example workstation 124. At the fifth operation 310, the example blueprint service 126 creates a deployment. For example, the blueprint service 126 may transmit the deployment. In some examples, the blueprint service 126 transmits the deployment to the example consumer service 128 for approval. The example deployment may include virtual machines and with the selected uncompleted provisioning template which represents enforcement policies.

At the sixth operation 312, the example consumer service 128 performs an approval. For example, the consumer service 128 may use the consumer service 128 (as illustrated by the loop of the sixth operation 312). After the approval of the deployment, the uncompleted provisioning template is referred to as a completed provisioning template (e.g., final template, filled template, developed template, used template, inhabited template, completed VMware's VCT® schema, second template information, etc.).

At the seventh operation 314, after approval by the example consumer service 128, the example blueprint service 126 provisions the example completed provisioning template. For example, the blueprint service 126 transmits an example provisioning request to the example enforcement provider 130. The example provisioning request includes (e.g., embeds) a completed provisioning template which is to be converted into a provisioned enforcement policy by the example enforcement provider 130.

At the eighth operation 316, the example enforcement provider 130 extracts and converts the enforcement policy embedded in the provisioning request document transmitted by the example blueprint service 126. For example, the enforcement provider 130 copies some of the information in the completed provisioning template and pastes the information into a provisioned enforcement policy (e.g., provisioned enforcement protocol, provisioned organizational policy, VMware's Guardrails® security policy, VMware's Guardrails® template file, second enforcement information, etc.).

At the ninth operation 318, the example enforcement provider 130 after conversion of the completed provisioning template into a provisioned enforcement policy, transmits the provisioned enforcement policy to the example enforcement service 112. The example enforcement service 112 is able to read the format of the enforcement policies and enforces the desired state (e.g., target state) of the provisioned (e.g., deployed) cloud resources.

Flowcharts representative of example machine readable instructions, which may be executed by programmable circuitry to implement and/or instantiate the enforcement provider 130 of FIG. 2 and/or representative of example operations which may be performed by programmable circuitry to implement and/or instantiate the enforcement provider 130 of FIG. 2, are shown in FIGS. 4-6. The machine readable instructions may be one or more executable programs or portion(s) of one or more executable programs for execution by programmable circuitry such as the programmable circuitry 1012 shown in the example programmable circuitry platform 1000 discussed below in connection with FIG. 10 and/or may be one or more function(s) or portion(s) of functions to be performed by the example programmable circuitry (e.g., an FPGA) discussed below in connection with FIGS. 11 and/or 12. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 4-6, many other methods of implementing the example enforcement provider 130 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-6 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 4 is a flowchart representative of example machine readable instructions and/or example operations 400 that may be executed, instantiated, and/or performed by programmable circuitry to convert and transmit information. The example machine-readable instructions and/or the example operations 400 of FIG. 4 begin at block 402, at which the example network interface circuitry 202 accesses an exposed enforcement policy from the example enforcement service 112. For example, the network interface circuitry 202 (FIG. 2) of the example enforcement provider 130 (FIG. 3) may access (e.g., retrieve, obtain, download) the exposed enforcement policy (e.g., e.g., exposed enforcement protocol, exposed organizational policy, VMware's Guardrails® security policy, VMware's Guardrails® template file, first enforcement information, etc.) from the example enforcement service 112 (FIG. 3).

At block 404, the example converter circuitry 210 converts the exposed enforcement policy into an uncompleted provisioning template. Block 404 is further described in connection with FIG. 5. In some examples, the converter circuitry 210 and the example duplication circuitry 212 convert the exposed enforcement policy.

At block 406, the example consumer access circuitry 208 by using the example network interface circuitry 202 provides the uncompleted provisioning template to the example consumer service 128 (FIG. 3). For example, the consumer access circuitry 208 may register the uncompleted provisioning template as a user-selectable VCT file in the example consumer service 128 (FIG. 3).

At block 408, after the example workstation 124 (FIG. 3), the example blueprint service 126 (FIG. 3), and the example consumer service 128 (FIG. 3) complete more operations an update the uncompleted provisioning template to a completed provisioning template, the example blueprint access circuitry 206 by using the network interface circuitry 202 receives a provisioning request from the example blueprint service 126 (FIG. 3). The provisioning request includes the completed provisioning template and the cloud resources that the enforcement service 112 (FIG. 3) is to enforce the enforcement policies embedded in the completed provisioning template.

At block 410, the example converter circuitry 210 converts the completed provisioning template to a provisioned enforcement policy. Further details of block 410 are shown in connection with FIG. 6. Control advances to block 412.

At block 412, the example enforcement access circuitry 204 by using the example network interface circuitry 202 provides the provisioned enforcement policy to the example enforcement service 112. The example instructions 400 end.

FIG. 5 is a flowchart representative of example machine readable instructions and/or example operations that may be executed, instantiated, and/or performed by example programmable circuitry to implement the enforcement provider 130 of FIG. 2 to convert first enforcement protocol information into user-selectable template file information. FIG. 5 illustrates further details of the example block 404. At block 502, the example network interface circuitry 202 retrieves uncompleted provisioning template with a plurality of placeholders (e.g., placeholder data). For example, the network interface circuitry 202 may have previously downloaded the example uncompleted provisioning template to an example system storage. After inspecting the example provisioning template, the example network interface circuitry 202 may determine that there are multiple placeholders to be filled with specific enforcement protocol data (e.g., attribute data).

At block 504, the example converter circuitry 210 determines the type of the selected placeholder. For example, some example types that the placeholder may be assigned are the "name" type, the "version" type, the "cloud provider" type, the "description" type, and the "parameters" type. An example metadata portion (e.g., definition section) of the example enforcement policy includes attribute data which corresponds to the types of the example provisioning template. In such examples, the attribute data may include the name (e.g., "DENY CREATION OF LARGE EC2 INSTANCES), and recommended cloud provider (e.g., "AWS"). This attribute data is to be copied by the example duplication circuitry 212.

At block 506, the example duplication circuitry 212 copies the exposed enforcement policy data corresponding to the determined type of the selected placeholder. For example, the duplication circuitry 212 may copy attribute data from a metadata section (e.g., portion) of the enforcement policy. In such examples, the attribute data may correspond to the type of the selected placeholder. For example, if the selected type of the selected placeholder is name data, the example duplication circuitry 212 copies the name from the metadata section of the enforcement policy.

At block 508, the example duplication circuitry 212 fills the selected placeholder of the provisioning template with the copied enforcement policy data. For example, the duplication circuitry 212 fills (e.g., pastes, replicates, provides) the copied enforcement policy data in the location of the placeholder data. For example, if, at block 506, the example duplication circuitry 212 copied the name attribute data, at block 508, the duplication circuitry 212 fills the name placeholder data (e.g., "<NAME OF TEMPLATE>") with the copied name attribute data (e.g., "DENY CREATION OF LARGE EC2 INSTANCE").

At block 510, the example converter circuitry 210 determines if there is another placeholder in the example provisioning template to fill. For example, in response to the example converter circuitry 210 determining that there is another placeholder in the example provisioning template to fill (e.g., "YES"), control returns to block 504. Alternatively, in response to the converter circuitry 210 determining that there is not another placeholder in the example user-selectable template to fill (e.g., "NO"), control advances to block 512.

At block 512, the example consumer access circuitry 208 saves the provisioning template. In some examples, the network interface circuitry 202 saves the provisioning template as an uncompleted provisioning template. The example uncompleted provisioning template will be referred to as a completed provisioning template after the user selects the cloud resources to be monitored by the example enforcement service 112 and attaches the provisioning template to the selected cloud resources. After block 512, control returns to block 406 of FIG. 4.

FIG. 6 is a flowchart representative of example machine readable instructions and/or example operations that may be executed, instantiated, and/or performed by example programmable circuitry to implement the enforcement provider 130 of FIG. 2 to convert completed provisioning template into provisioned enforcement policy. At block 602, the example network interface circuitry 202 accesses the enforcement policy information stored in the example provisioning template. In some examples, the blueprint access circuitry 206 accesses a provisioning request the example blueprint service 126. The example provisioning request includes the example completed provisioning template.

At block 604, the example converter circuitry 210 determines the provisioned enforcement policy data in the provisioning template. For example, the converter circuitry 210 may determine the enforcement service information by determining which virtual machines are to be monitored by the example enforcement service 112 (FIG. 3). In some examples, the converter circuitry 210 determines the location of the attribute data in the completed provisioning template based on the location of the attribute data in the uncompleted provisioning template.

At block 606, the example duplication circuitry 212 copies the example determined provisioned enforcement policy data to a provisioned enforcement policy. The example duplication circuitry 212 may copy the provisioned enforcement policy data and then replace placeholder data from a template enforcement policy.

At block 608, the example converter circuitry 210 saves the provisioned enforcement policy. For example, the converter circuitry 210 may save the provisioned enforcement policy in a format that is readable by the example enforcement service 112 (FIG. 3). After block 608, control returns to block 412 of FIG. 4.

FIG. 7A is an example of an exposed enforcement policy. The example of FIG. 7A illustrates a software instruction representation 702 of the exposed enforcement policy. The example software instruction representation 702 includes an example name 708A (e.g., "SCP DENY LARGE EC2") and an example provider 712A (e.g., "AWS"). In the example of FIGS. 7A-7C, the name 708A and the provider 712A is the data from the example enforcement policy which will be used in updating the provisioning template by the example duplication circuitry 212 replacing the placeholder data. However, in other examples, different amounts of data (e.g., more data, less data) and different types of data (e.g., description data, input data, category data) may be used from the example metadata section of the enforcement policy in updating the provisioning template.

FIG. 7B is an example of an example provisioning template file with placeholder data. The example of FIG. 7B illustrates a software instruction representation 704 of an uncompleted provisioning template (e.g., new template, fresh template, blank template, unused template, uninhabited template, uncompleted VMware's VCT® schema, first template information, user-selectable template). The example software instruction representation 704 of the uncompleted provisioning template includes placeholder data. The example software instruction representation 704 includes an example placeholder name 708B (e.g., "NAME OF TEMPLATE") and an example placeholder provider 712B (e.g., "NAME OF PROVIDER").

FIG. 7C is the example template file of FIG. 7B filled with the example enforcement policy information of FIG. 7A. The example of FIG. 7C illustrates a software instruction representation 706 of an uncompleted provisioning template that is ready for transmission to the example consumer service 128 (FIG. 3). After the example enforcement provider 130 (FIG. 3) receives the provisioning template from the example blueprint service 126 (FIG. 3), the provisioning template is referred to as a completed provisioning template (e.g., final template, filled template, developed template, used template, inhabited template, completed VMware's VCT® schema, second template information, etc.) as cloud resource identification information is stored in the example completed provisioning template. The example software instruction representation 706 includes an example name 708C (e.g., "SCP_DENY_LARGE_EC2") and an example provider 712C (e.g., "AWS"). The provisioning template is ready to be transmitted to an example consumer service 128 (FIG. 3) by the example consumer access circuitry 208 (FIG. 2) and the example network interface circuitry 202 (FIG. 2).

Figure 8:
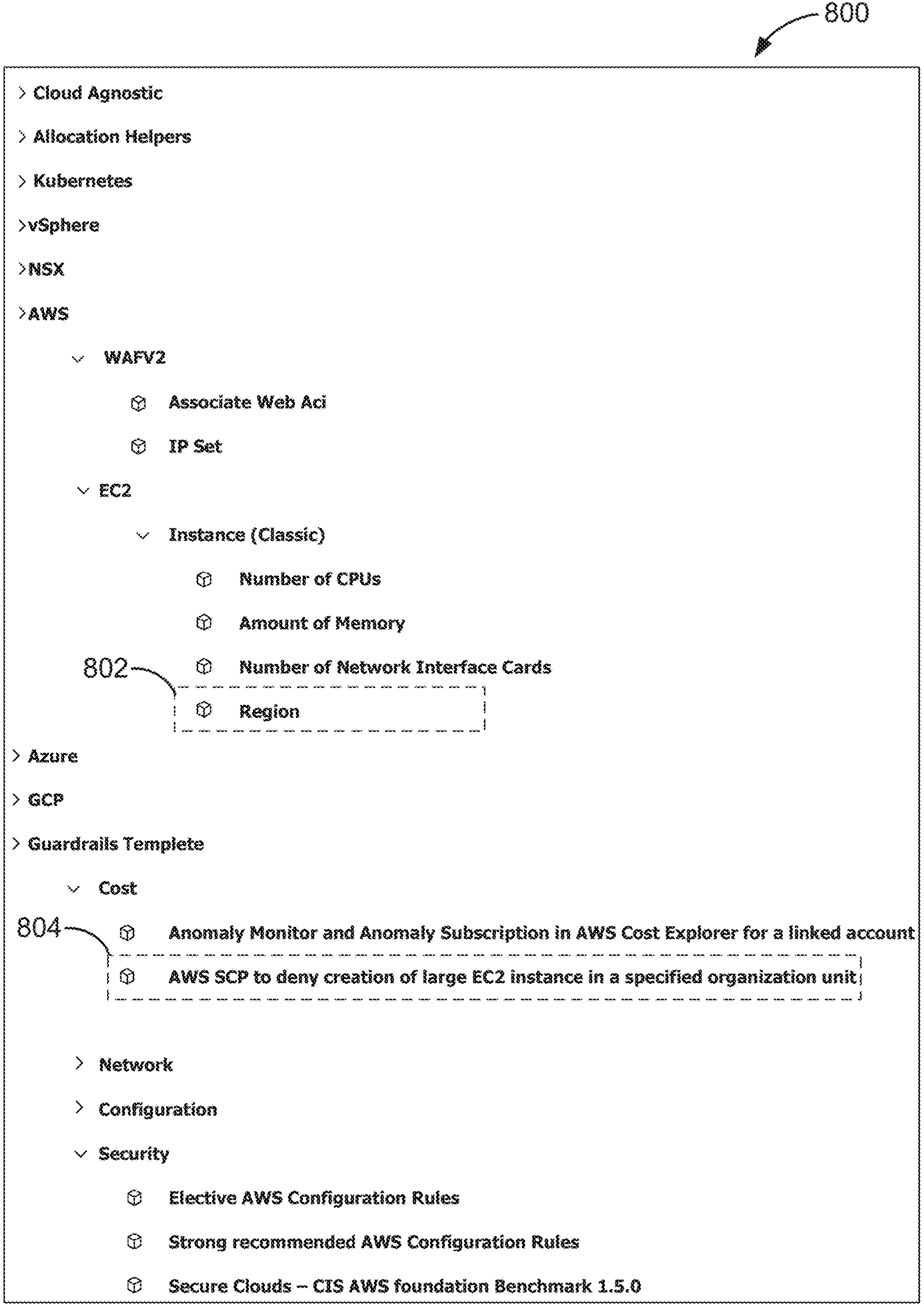
FIG. 8 is a graphical user interface (GUI) of an example menu with user-selectable information.

FIG. 8 is a graphical user interface (GUI) of an example menu 800 with user-selectable information. The example menu 800 includes multiple providers (e.g., "Cloud Agnostic," "Allocation Helpers," "Kubernetes," "vSphere" (VMware vSphere®)), "NSX," "AWS" (Amazon Web Services®), "Azure" (Microsoft Azure®), "GCP" (Google Cloud Platform™), "Guardrails" (VMware Aria® Guardrails™ enforcement service) etc.). The multiple providers provide cloud infrastructure resources for provisioning virtual machines. In some examples, a user may select a machine with four gigabytes of RAM, sixty-four gigabytes of storage, a first network connectivity, and a region (e.g., Americas, Europe, Pacific, etc.). In the example of FIG. 8, the user has selected a first attribute 802 (e.g., "Region") which is a component of an EC2 instance (e.g., virtual machine) offered from the AWS provider. However, in other examples, the user could explore the other providers (e.g., GCP, Azure, vSphere, etc.) and determine other components offered by the other providers. The example user selects an enforcement policy from the Guardrails™ enforcement service provider. In the example of FIG. 8, the user has selected a second attribute 804 (e.g., "AWS SCP to deny creation of large EC2 instance in a specified organization unit"). The second attribute 804, which is an enforcement policy can be applied to the virtual machine deployment that the example user is building (e.g., constructing) to be deployed.

Figure 9:
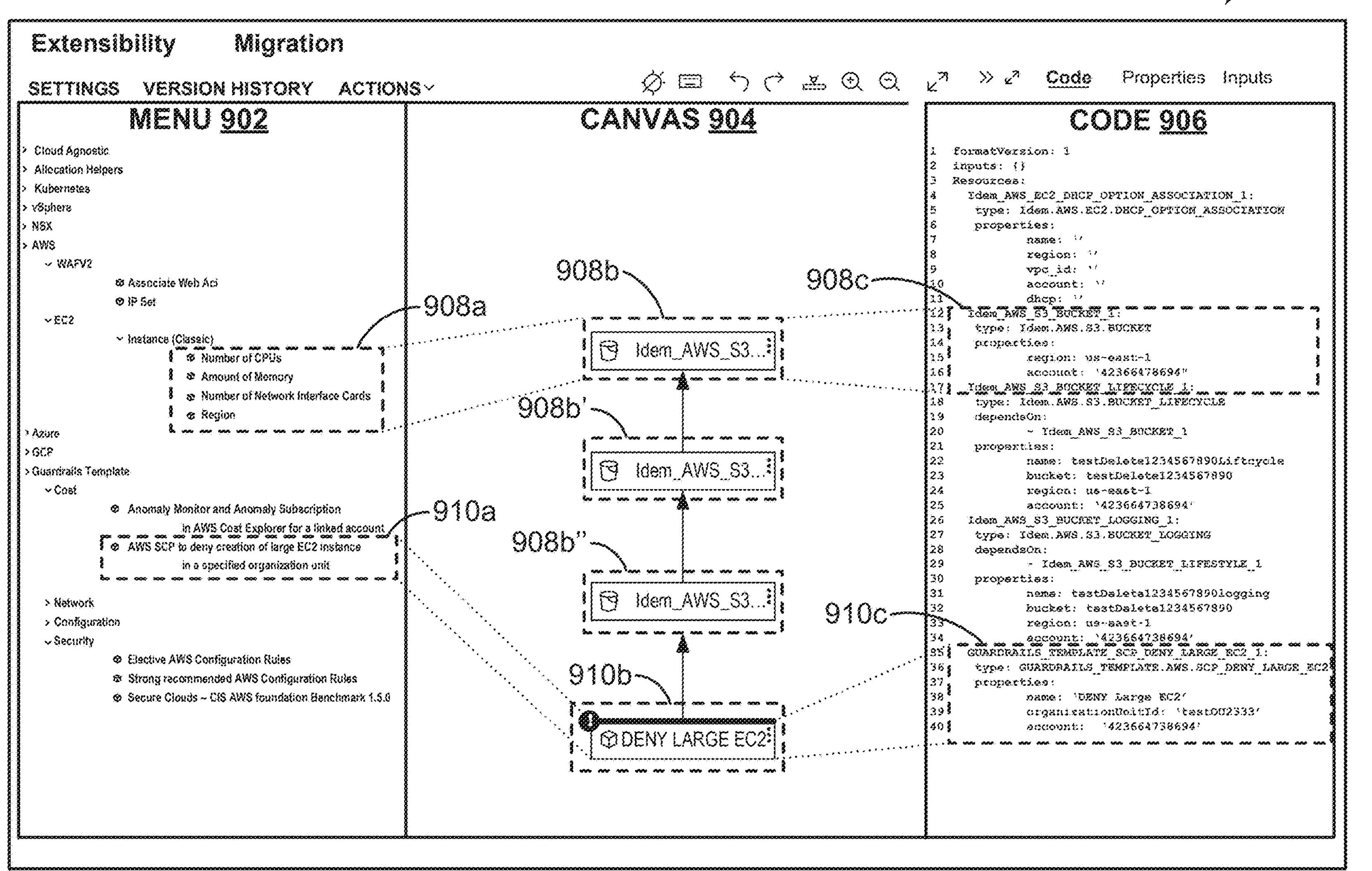
FIG. 9 is an example GUI of an example resource provisioning interface with the example menu of user-selectable information and the example visual cloud resources.

FIG. 9 is an example visual representation of an example resource provisioning interface 900. The example resource provisioning interface 900 includes an example menu 902 of user-selectable information, an example canvas 904 of selected cloud resources, and example code 906 which corresponds to the selected cloud resources. The example menu 902 is shown illustrated on the left-hand side of the resource provisioning interface 900. The example canvas 904 is shown illustrated in the middle of the resource provisioning interface 900. The example code 906 is shown illustrated on the right-hand side of the resource provisioning interface 900.

The example user, by operating the example workstation 124 which is in communication with the example blueprint service 126, may select in the example menu 902 an example virtual machine template 908A. The example canvas 904 includes three virtual machine instances 908B, 908B', 908B". The example third virtual machine instance 908B" depends on the example second virtual machine instance 908B', which depends on the example first virtual machine instance 908B. The example code 906 includes virtual machine code 908C which corresponds to the example first virtual machine instance 908B. The example user may select the user-selectable template information in the example menu 902 and then drag-and-drop the selected information into the example canvas 904. The example canvas 904 is a visual workspace for arranging the properties of the virtual machine instances 908B, 908B', 908B". While the example user operates the example canvas 904, the example code 906 is updated based on the selections (e.g., determinations) of the user.

In the example of FIG. 9, the example user has applied an enforcement policy instance 910B on at least one of the virtual machine instances 908B, 908B', 908B". The example enforcement policy instance 910B (e.g., "DENY LARGE EC2") is selected from the enforcement policy template 910A from the example menu 902. The example enforcement policy code 910C is automatically generated by the example blueprint service 126 once the example enforcement policy instance 910B is attached to the example third virtual machine instance 908B". As seen in the example enforcement policy code 910C, the account number is 423664738694 which is the same account number as the example first virtual machine instance 908B.

After the user has completed rearranging the cloud resources, the example blueprint service 126 (FIG. 1) creates a deployment of the arranged cloud resources which is transmitted to the example consumer service 128 (FIG. 1).

The example consumer service 128 (FIG. 1) approves the deployment of the cloud resources. After the deployment is approved, the example blueprint service 126 transmits a provisioning request corresponding to the approved deployment to the example enforcement provider 130. The example blueprint access circuitry 206 of the example enforcement provider 130 receives the provisioning request before extracting the information that corresponds to the enforcement policy (e.g., information for the enforcement service 112).

The example converter circuitry 210 of the example enforcement provider 130 converts the extracted enforcement protocol information from a user-selectable template format (e.g., the format of the example code 906, the format of the example software instruction representation 706 (FIG. 7C)) into an enforcement service format (e.g., the format of the example software instruction representation 702 (FIG. 7A)). The example enforcement provider 130 transmits the second enforcement protocol information to the example enforcement service 112, where the example enforcement service 112 is to monitor and enforce the protocols that the user selected for the cloud resources. The example enforcement service 112 may use the account number (423664738694) to track the example deployment of cloud resources to be monitored.

Figure 10:
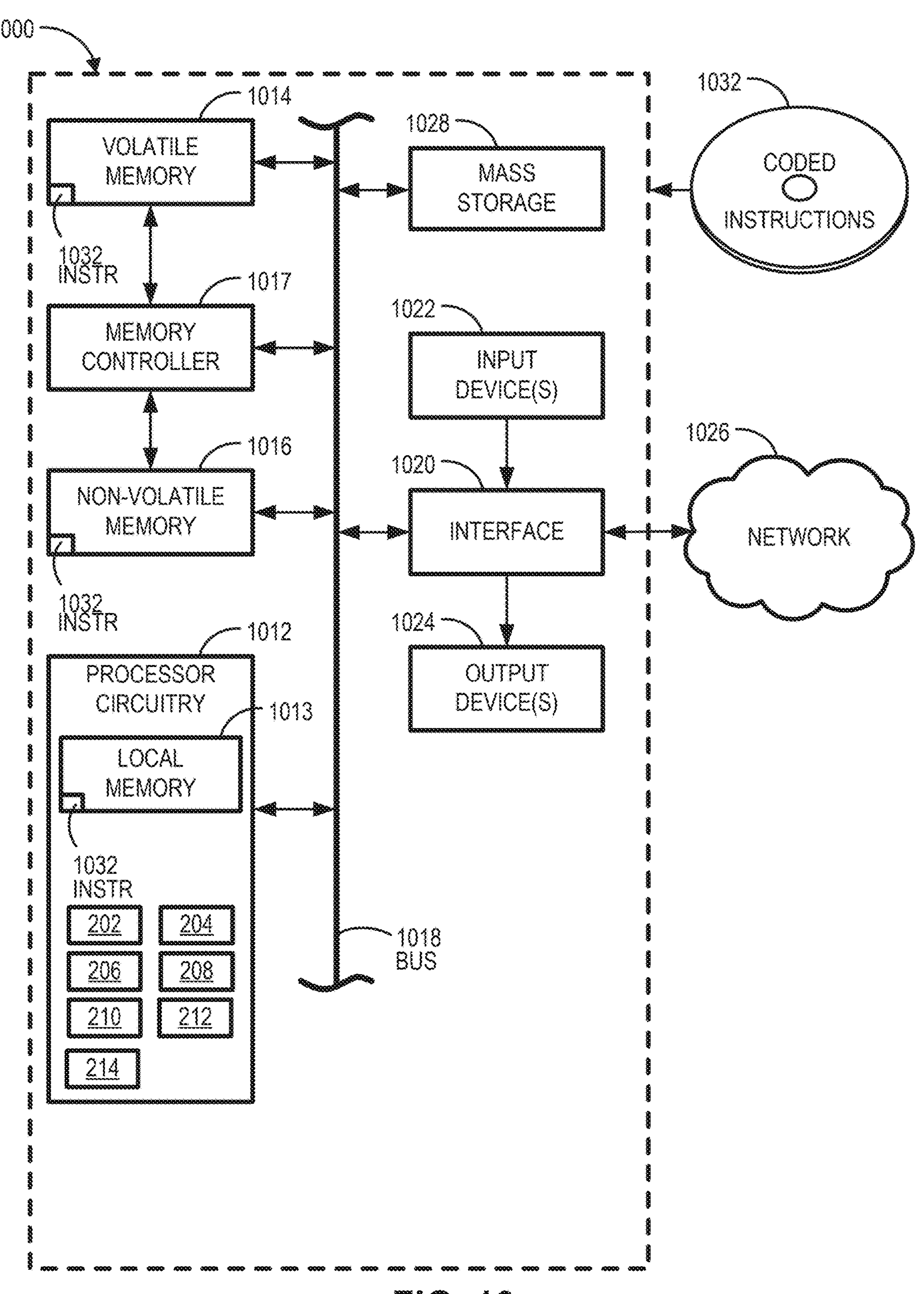
FIG. 10 is a block diagram of an example processing platform including programmable circuitry structured to execute, instantiate, and/or perform the example machine readable instructions and/or perform the example operations of FIGS. 4-6 to implement the enforcement provider of FIG. 2.

FIG. 10 is a block diagram of an example programmable circuitry platform 1000 structured to execute and/or instantiate the example machine-readable instructions and/or the example operations of FIGS. 4-6 to implement the enforcement provider 130 of FIG. 2. The programmable circuitry platform 1000 can be, for example, a server, a personal computer, a workstation, a self-learning machine (e.g., a neural network), a mobile device (e.g., a cell phone, a smart phone, a tablet such as an iPad™), or any other type of computing and/or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, and/or microcontrollers from any desired family or manufacturer. The programmable circuitry 1012 may be implemented by one or more semiconductor based (e.g., silicon based) devices. In this example, the programmable circuitry 1012 implements the example network interface circuitry 202, the example enforcement access circuitry 204, the example blueprint access circuitry 206, the example consumer access circuitry 208, the example converter circuitry 210, and the example duplication circuitry 212.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user (e.g., a human user, a machine user, etc.) to enter data and/or commands into the programmable circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1000 of the illustrated example also includes one or more mass storage discs or devices 1028 to store firmware, software, and/or data. Examples of such mass storage discs or devices 1028 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1032, which may be implemented by the machine readable instructions of FIGS. 4-6, may be stored in the mass storage device 1028, in the volatile memory 1014, in the non-volatile memory 1016, and/or on at least one non-transitory computer readable storage medium such as a CD or DVD which may be removable.

Figure 11:
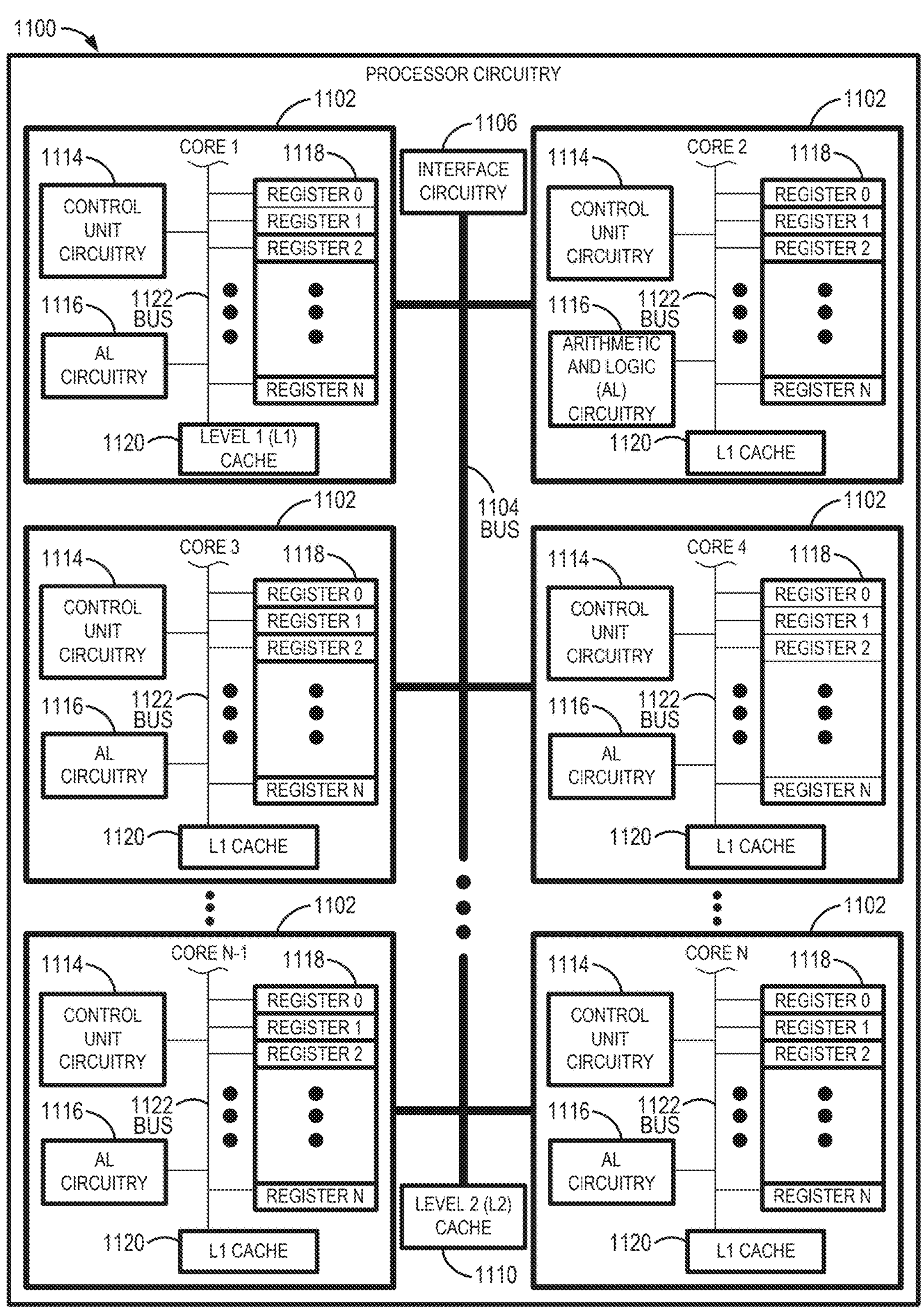
FIG. 11 is a block diagram of an example implementation of the programmable circuitry of FIG. 10.

FIG. 11 is a block diagram of an example implementation of the programmable circuitry 1012 of FIG. 10. In this example, the programmable circuitry 1012 of FIG. 10 is implemented by a microprocessor 1100. For example, the microprocessor 1100 may be a general-purpose microprocessor (e.g., general-purpose microprocessor circuitry). The microprocessor 1100 executes some or all of the machine-readable instructions of the flowcharts of FIGS. 4-6 to effectively instantiate the circuitry of FIG. 2 as logic circuits to perform operations corresponding to those machine readable instructions. In some such examples, the circuitry of FIG. 2 is instantiated by the hardware circuits of the microprocessor 1100 in combination with the machine-readable instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 4-6.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating-point operations. In yet other examples, the AL circuitry 1116 may include first AL circuitry that performs integer-based operations and second AL circuitry that performs floating-point operations. In some examples, the AL circuitry 1116 may be referred to as an Arithmetic Logic Unit (ALU).

The registers 1118 are semiconductor-based structures to store data and/or instructions such as results of one or more of the operations performed by the AL circuitry 1116 of the corresponding core 1102. For example, the registers 1118 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure, such as by being distributed throughout the core 1102 to shorten access time. The second bus 1122 may be implemented by at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages.

The microprocessor 1100 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1100, in the same chip package as the microprocessor 1100 and/or in one or more separate packages from the microprocessor 1100.

Figure 12:
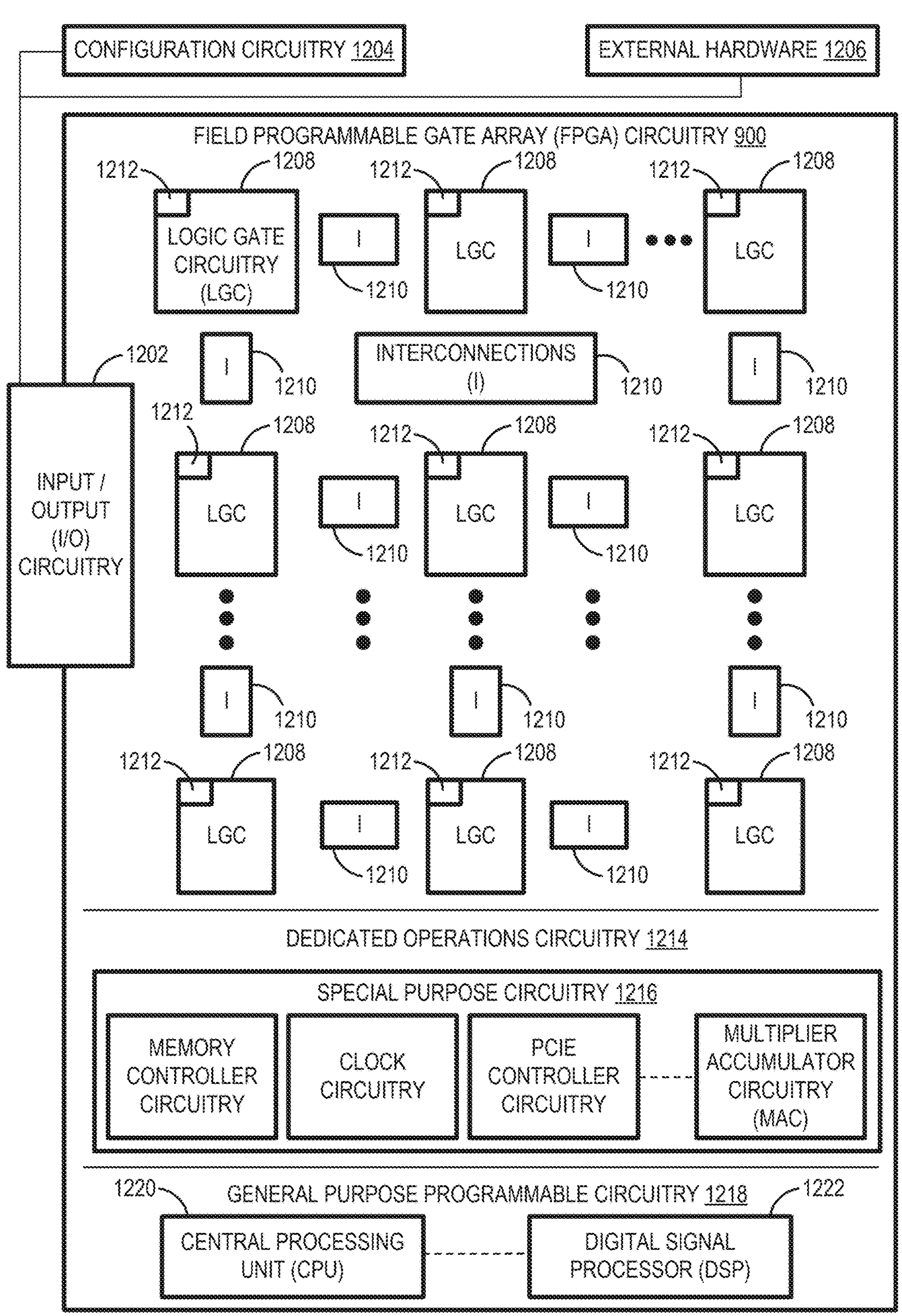
FIG. 12 is a block diagram of another example implementation of the programmable circuitry of FIG. 10.

FIG. 12 is a block diagram of another example implementation of the programmable circuitry 1012 of FIG. 10. In this example, the programmable circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1100 of FIG. 11 described above (which is a general purpose device that may be programmed to execute some or all of the machine readable instructions represented by the flowchart (s) of FIGS. 4-6 but whose interconnections and logic circuitry are fixed once fabricated), the FPGA circuitry 1200 of the example of FIG. 12 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 4-6. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 4-6. As such, the FPGA circuitry 1200 may be configured and/or structured to effectively instantiate some or all of the operations/functions corresponding to the machine readable instructions of the flowchart(s) of FIGS. 4-6 as dedicated logic circuits to perform the operations/functions corresponding to those software instructions in a dedicated manner analogous to an ASIC. Therefore, the FPGA circuitry 1200 may perform the operations/functions corresponding to the some or all of the machine readable instructions of FIGS. 4-6 faster than the general-purpose microprocessor can execute the same.

In the example of FIG. 12, the FPGA circuitry 1200 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain a binary file, which may be implemented by a bit stream, data, and/or machine-readable instructions, to configure the FPGA circuitry 1200, or portion(s) thereof. In some such examples, the configuration circuitry 1204 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1206 may be implemented by external hardware circuitry. For example, the external hardware 1206 may be implemented by the microprocessor 1100 of FIG. 11.

The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations/functions that may correspond to at least some of the machine readable instructions of FIGS. 4-6 and/or other desired operations. The logic gate circuitry 1208 shown in FIG. 12 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations/functions. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example dedicated operations circuitry 1214. In this example, the dedicated operations circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the programmable circuitry 1012 of FIG. 10, many other approaches are contemplated. For example, FPGA circuitry may include an on-board CPU, such as one or more of the example CPU 1220 of FIG. 11. Therefore, the programmable circuitry 1012 of FIG. 10 may additionally be implemented by combining at least the example microprocessor 1100 of FIG. 11 and the example FPGA circuitry 1200 of FIG. 12. In some such hybrid examples, one or more cores 1102 of FIG. 11 may execute a first portion of the machine readable instructions represented by the flowchart(s) of FIGS. 4-6 to perform first operation(s)/function(s), the FPGA circuitry 1200 of FIG. 12 may be configured and/or structured to perform second operation(s)/function(s) corresponding to a second portion of the machine readable instructions represented by the flowcharts of FIGS. 4-6, and/or an ASIC may be configured and/or structured to perform third operation(s)/function(s) corresponding to a third portion of the machine readable instructions represented by the flowcharts of FIGS. 4-6.

It should be understood that some or all of the circuitry of FIG. 2 may, thus, be instantiated at the same or different times. For example, same and/or different portion(s) of the microprocessor 1100 of FIG. 11 may be programmed to execute portion(s) of machine-readable instructions at the same and/or different times. In some examples, same and/or different portion(s) of the FPGA circuitry 1200 of FIG. 12 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 1100 of FIG. 11 may execute machine readable instructions in one or more threads executing concurrently and/or in series. In some examples, the FPGA circuitry 1200 of FIG. 12 may be configured and/or structured to carry out operations/functions concurrently and/or in series. Moreover, in some examples, some or all of the circuitry of FIG. 2 may be implemented within one or more virtual machines and/or containers executing on the microprocessor 1100 of FIG. 11.

In some examples, the programmable circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the programmable circuitry 1012 of FIG. 10, which may be in one or more packages. For example, the XPU may include a CPU (e.g., the microprocessor 1100 of FIG. 11, the CPU 1220 of FIG. 12, etc.) in one package, a DSP (e.g., the DSP 1222 of FIG. 12) in another package, a GPU in yet another package, and an FPGA (e.g., the FPGA circuitry 1200 of FIG. 12) in still yet another package.

Figure 13:
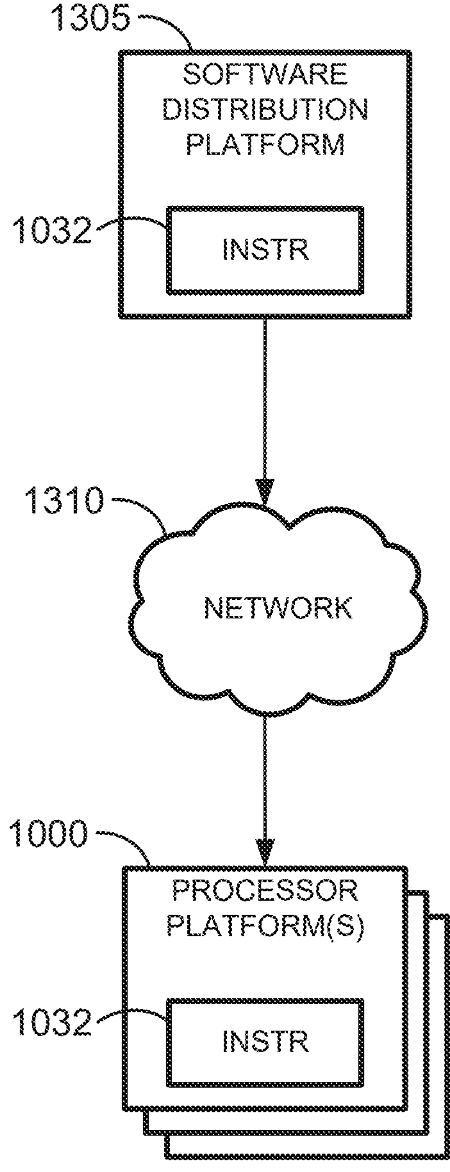
FIG. 13 is a block diagram of an example software/firmware/instructions distribution platform (e.g., one or more servers) to distribute software, instructions, and/or firmware (e.g., corresponding to the example machine readable instructions of FIGS. 4-6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to other hardware devices (e.g., hardware devices owned and/or operated by third parties from the owner and/or operator of the software distribution platform) is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions of FIGS. 4-6, as described above. The one or more servers of the example software distribution platform 1305 are in communication with an example network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions of FIGS. 4-6, may be downloaded to the example programmable circuitry platform 1000, which is to execute the machine readable instructions 1032 to implement the enforcement provider 130. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that converting enforcement policy information into provisioning template information. Disclosed systems, apparatus, articles of manufacture, and methods improve the efficiency of using a computing device by allowing information in a first format native to a first service to be utilized by a second service in a second format. By converting between formats, the techniques disclosed herein reduce error message communications sent between the two services. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture for converting enforcement policy information into provisioning template information are disclosed herein. Further examples and combinations thereof include the following: Example 1 includes a non-transitory machine readable storage medium comprising instructions to cause programmable circuitry to at least determining a type of a first placeholder of a provisioning template with a plurality of placeholders, copying enforcement policy data corresponding to the determined type of the first placeholder, filling the first placeholder of the provisioning template with the copied enforcement policy data, and saving the provisioning template.

Example 2 includes the storage medium of example 1, wherein the provisioning template offered as a selectable cloud resource.

Example 3 includes the storage medium of example 1, wherein the provisioning template offers an enforcement of a configuration state of a virtual machine.

Example 4 includes the storage medium of example 1, further including providing the provisioning template to a consumer service, the consumer service accessible by a user account.

Example 5 includes the storage medium of example 1, further including receiving a provisioning request that includes a modified version of the provisioning template.

Example 6 includes the storage medium of example 5, further including converting the modified version of the provisioning template into second enforcement policy data.

Example 7 includes the storage medium of example 6, further including providing the second enforcement policy data to an enforcement service, the enforcement service to enforce a target configuration state of provisioned cloud resources according to the provisioning request.

Example 8 includes the storage medium of example 1, further including accessing a first enforcement policy from an enforcement service and extracting the policy enforcement data from the first enforcement policy.

Example 9 includes a system comprising network interface circuitry, machine-readable instructions, and programmable circuitry to at least one of instantiate or execute the machine-readable instructions to determine a type of a first placeholder of a provisioning template with a plurality of placeholders, copy enforcement policy data corresponding to the determined type of the first placeholder, fill the first placeholder of the provisioning template with the copied enforcement policy data, and save the provisioning template.

Example 10 includes the system of example 9, wherein the provisioning template offered as a selectable cloud resource.

Example 11 includes the system of example 9, wherein the provisioning template offers an enforcement of a configuration state of a virtual machine.

Example 12 includes the system of example 9, wherein the programmable circuitry is further to provide the provisioning template to a consumer service, the consumer service accessible by a user account.

Example 13 includes the system of example 9, wherein the programmable circuitry is further to receive a provisioning request that includes a modified version of the provisioning template.

Example 14 includes the system of example 13, wherein the programmable circuitry is further to convert the modified version of the provisioning template into second enforcement policy data.

Example 15 includes the system of example 14, wherein the programmable circuitry is further to provide the second enforcement policy data to an enforcement service, the enforcement service to enforce a target configuration state of provisioned cloud resources according to the provisioning request.

Example 16 includes the system of example 9, wherein the programmable circuitry is further to access a first enforcement policy from an enforcement service and extracting the enforcement policy data from the first enforcement policy.

Example 17 includes a system comprising an enforcement provider, an enforcement service, a blueprint service, a consumer service, the enforcement provider to retrieve first enforcement policy information from the enforcement service, convert the first enforcement policy information into provisioning template information, and provide the provisioning template to the consumer service, the blueprint service to receive a provisioning request from a user account, the provisioning request to include a modified version of the provisioning template, generate a deployment based on the provisioning request, and submit the generated deployment for approval by the consumer service, and the consumer service to approve the generated deployment.

Example 18 includes the system of example 17, wherein the blueprint service is to transmit the approved deployment to the enforcement provider.

Example 19 includes the system of example 18, wherein the enforcement provider is to convert a portion of the approved deployment to second enforcement policy information, and transmit the second enforcement policy information to the enforcement service.

Example 20 includes the system of example 19, wherein the enforcement service to enforce the second enforcement policy information.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A non-transitory machine readable storage medium comprising instructions to cause a programmable circuitry to at least:

determine a type of a first placeholder of the provisioning template with a plurality of placeholders;

copy enforcement policy data corresponding to the determined type of the first placeholder;

determine a location for a name data in the enforcement policy in a metadata location and corresponding location for the name data in a provisional template;

fill the first placeholder of the provisioning template with the copied enforcement policy data;

save the provisioning template;

cause an enforcement of provisional template by an enforcement service.

2. The storage medium of claim 1, wherein the provisioning template is offered as a selectable cloud resource.

3. The storage medium of claim 1, wherein the provisioning template offers an enforcement of a configuration state of a virtual machine.

4. The storage medium of claim 1, wherein the programmable circuitry is to provide the provisioning template to a consumer service, the consumer service accessible by a user account.

5. The storage medium of claim 1, wherein the programmable circuitry is to receive a provisioning request that includes a modified version of the provisioning template.

6. The storage medium of claim 5, wherein the programmable circuitry is to convert the modified version of the provisioning template into second enforcement policy data.

7. The storage medium of claim 6, wherein the programmable circuitry is to provide the second enforcement policy data to an enforcement service, the enforcement service to enforce a target configuration state of provisioned cloud resources according to the provisioning request.

8. The storage medium of claim 1, wherein the programmable circuitry is to access a first enforcement policy from an enforcement service and extracting a policy enforcement data from the first enforcement policy.

9. A system comprising:

network interface circuitry;

machine-readable instructions; and programmable circuitry to at least one of instantiate or execute the machine-readable instructions to:

determine a type of a first placeholder of a provisioning template with a plurality of placeholders;

copy enforcement policy data corresponding to the determined type of the first placeholder;

determine a location for a name data in the enforcement policy in a metadata location and corresponding location for the name data in a provisional template;

fill the first placeholder of the provisioning template with the copied enforcement policy data;

save the provisioning template; and cause an enforcement of provisional template by an enforcement service.

10. The system of claim 9, wherein the provisioning template is offered as a selectable cloud resource.

11. The system of claim 9, wherein the provisioning template offers an enforcement of a configuration state of a virtual machine.

12. The system of claim 9, wherein the programmable circuitry is further to provide the provisioning template to a consumer service, the consumer service accessible by a user account.

13. The system of claim 9, wherein the programmable circuitry is further to receive a provisioning request that includes a modified version of the provisioning template.

14. The system of claim 13, wherein the programmable circuitry is further to convert the modified version of the provisioning template into second enforcement policy data.

15. The system of claim 14, wherein the programmable circuitry is further to provide the second enforcement policy data to an enforcement service, the enforcement service to enforce a target configuration state of provisioned cloud resources according to the provisioning request.

16. The system of claim 9, wherein the programmable circuitry is further to access a first enforcement policy from an enforcement service and extracting the enforcement policy data from the first enforcement policy.

17. A system comprising:

an enforcement provider;

an enforcement service;

a blueprint service;

a consumer service, the enforcement provider to:

retrieve first enforcement policy information from the enforcement service;

convert the first enforcement policy information into a provisioning template; and provide the provisioning template to the consumer service;

the blueprint service to:

obtain a provisioning request from a user account, the provisioning request to include a modified version of the provisioning template;

determine a location for name data in the enforcement policy in a metadata location and corresponding location for the name data in a provisional template;

generate a deployment based on the provisioning request; and submit the generated deployment for approval by the consumer service;

the consumer service to approve the generated deployment;

provide enforcement using at least the provisional template.

18. The system of claim 17, wherein the blueprint service is to transmit the approved deployment to the enforcement provider.

19. The system of claim 18, wherein the enforcement provider is to:

convert a portion of the approved deployment to second enforcement policy information; and transmit the second enforcement policy information to the enforcement service.

20. The system of claim 19, wherein the enforcement service to enforce the second enforcement policy information.

* * * * *